US009103947B2

(12) United States Patent
Brown et al.

(10) Patent No.: US 9,103,947 B2
(45) Date of Patent: Aug. 11, 2015

(54) THREE-POINT FOCUS SPACER AND WISHBONE RETENTION

(75) Inventors: Lance T. Brown, Tuscon, AZ (US); Phil C. White, Tucson, AZ (US); Christopher J. Stein, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 233 days.

(21) Appl. No.: 13/565,050

(22) Filed: Aug. 2, 2012

(65) Prior Publication Data

US 2014/0036365 A1 Feb. 6, 2014

(51) Int. Cl.
*G02B 7/00* (2006.01)

(52) U.S. Cl.
CPC ........................................ *G02B 7/00* (2013.01)

(58) Field of Classification Search
CPC ........ G02B 7/00; G02B 7/026; G02B 7/1822; G02B 7/22; G02B 23/08; G02B 23/2476; B60R 1/10
USPC .......................................... 359/503–506, 894
See application file for complete search history.

(56) References Cited

U.S. PATENT DOCUMENTS

2010/0103543 A1* 4/2010 Takahashi ..................... 359/825

* cited by examiner

*Primary Examiner* — Jennifer L. Doak

(57) ABSTRACT

A system includes a light detector, optics, a telescope camera mount, a plurality of spacers, and a retainer. The optics are configured to focus light on the light detector. The telescope camera mount is configured to at least partially support the optics. The plurality of spacers are positioned between the optics and the light detector. A retainer is coupled to the plurality of spacers.

23 Claims, 3 Drawing Sheets

THREE-POINT FOCUS SPACER AND WISHBONE RETENTION

TECHNICAL FIELD

This disclosure is generally directed to systems for aircraft. More specifically, this disclosure is directed to any system with a three-point spacer with wishbone retention.

BACKGROUND

Conventional missiles include metallic shims in their optics for their infrared seekers, which is the part of the missile used to home in on a target. The shims adjust the focus of light within the optical system.

SUMMARY

This disclosure provides a system with a three-point focus spacer and wishbone retention.

According to an embodiment, a system includes a light detector, optics, a telescope camera mount, a plurality of spacers, and a retainer. The optics are configured to focus light on the light detector. The telescope camera mount is configured to at least partially support the optics. The plurality of spacers are positioned between the optics and the light detector. A retainer is coupled to the plurality of spacers.

Certain embodiments may provide various technical advantages depending on the implementation. For example, a technical advantage of some embodiments may include the capability to provide like-sized spacers for mounting between optics and a light detector. A technical advantage of other embodiments may include the capability to provide a retainer that assists mounting of spacers between optics and a light detector and then is removed. Yet another technical advantage may include the capability for stacking like-sized spacers for fine-tune adjusting of light upon a light detector. Yet another technical advantage may include the capability to provide a retainer that assists mounting of spacers between optics. Yet another technical advantage may include the capability to provide a retainer that assists mounting of spacers between components in a non-optical system. A further technical advantage may include features on the retainer for ease of handling.

Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
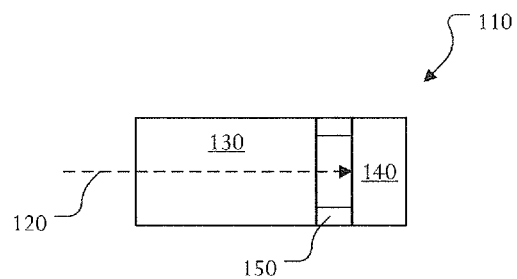
FIG. 1 introduces with block diagrams concepts of the disclosure.

FIG. 1 introduces with block diagrams concepts of the disclosure. In a fixed focus optical system 110, light 120 may be introduced through optics 130 (e.g., mirrors and lenses) onto a light detector 130. The focus of light on the light detector 140 may be adjusted by introducing spacer(s) 150, which are sometimes referred to as a "shim." Among other things, the spacer(s) 150 can increase the distance the light travels between the optics 130 and the light detector 140. Although spacers are described as being placed between the optics 130 and the light detector 140, the spacer(s) 150 can also be placed between other elements in the fixed focus optical system 110, for example, between mirrors or lenses of the optics.

In conventional settings, a first spacer may be introduced into the fixed focus optical system. Then, tests may be conducted to determine whether the first spacer yields the appropriate focus on the light detector. If not, adjustments may be made, for example, by introducing a second or alternative spacer with a different thickness.

In such conventional settings, two approaches have been utilized. In a first approach, in order to minimize and distribute weight, three pad spacers are mounted in the same plane approximately 120 degrees apart from one another. A problem with this first approach arises from the fact that not every pad spacer has the same thickness. For example, as described above, different spacer thicknesses are typically utilized; and, in some scenarios, twenty or more different spacer thicknesses with very small size differences may be utilized to fine-tune a system. Accordingly, seemingly same thickness spacers may be utilized; however, tests reveal that one spacer may be larger than the other spacers, yielding an improper focus.

A second approach involves utilizing a single annular spacer of uniform thickness. This second approach partially alleviates the problem of the first approach; however, the singular annular shim introduces its own problem—increased and improperly distributed weight. Such a weight problem is exacerbated when larger thickness or larger diameters for the optics are utilized. Moreover, attempts to decrease the weight by only covering a portion of an annulus of a circle exacerbates weight distribution problems. Moreover, this single annular spacer may prohibitively occupy space where space is not available.

Thus, in conventional operations, one is forced with a decision as to whether they want to have problems with multiple non-uniform spacer or problems with weight for a single annular spacer. Given these concerns, certain embodiments of the disclosure provide a spacer configuration that alleviate both concerns.

Figure 2:
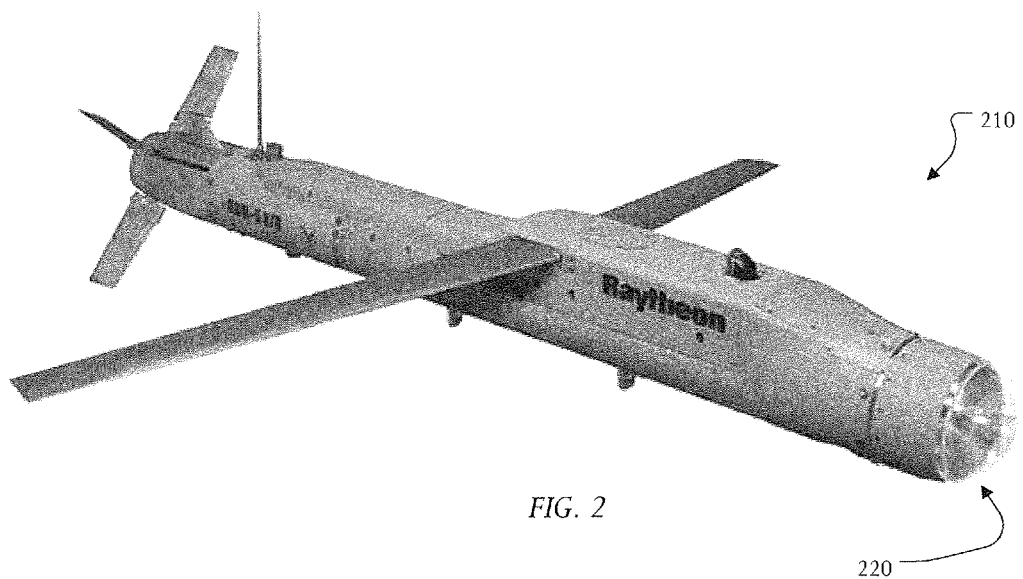
FIG. 2 illustrates an environmental view of an example system in which the optical system may be utilized.

FIG. 2 illustrates an environmental view of an example system 210 in which the optical system 220 (described more fully below) may be utilized. In particular, the example system 210 of FIG. 2 is a GBU-53/B Small Diameter Bomb Increment II (SDB II). As will be recognized by one of ordinary skill in the art, the GBU-53/B SDB II is an air-launched precision strike weapon that, among other features, includes a millimeter wave (MMW) radar to detect and track targets through weather, imaging infrared (IIR) for enhanced target discrimination and classification, and semi-active laser (SAL) for the maximum in operational flexibility. In FIG. 2, a clamshell cover (not shown) is removed to show a portion of an optical system 220. Light is introduced into the optical system 220 and measured to allow for adjustments to the example system 210 as necessary.

Although example system 210 in FIG. 1 is shown, it should be understood that the invention is not intended as being limited to the example system 210. Rather, other systems avail from teachings of the disclosure. Such other systems include aircraft, missiles, and any other fixed focus optical systems.

Figure 3:
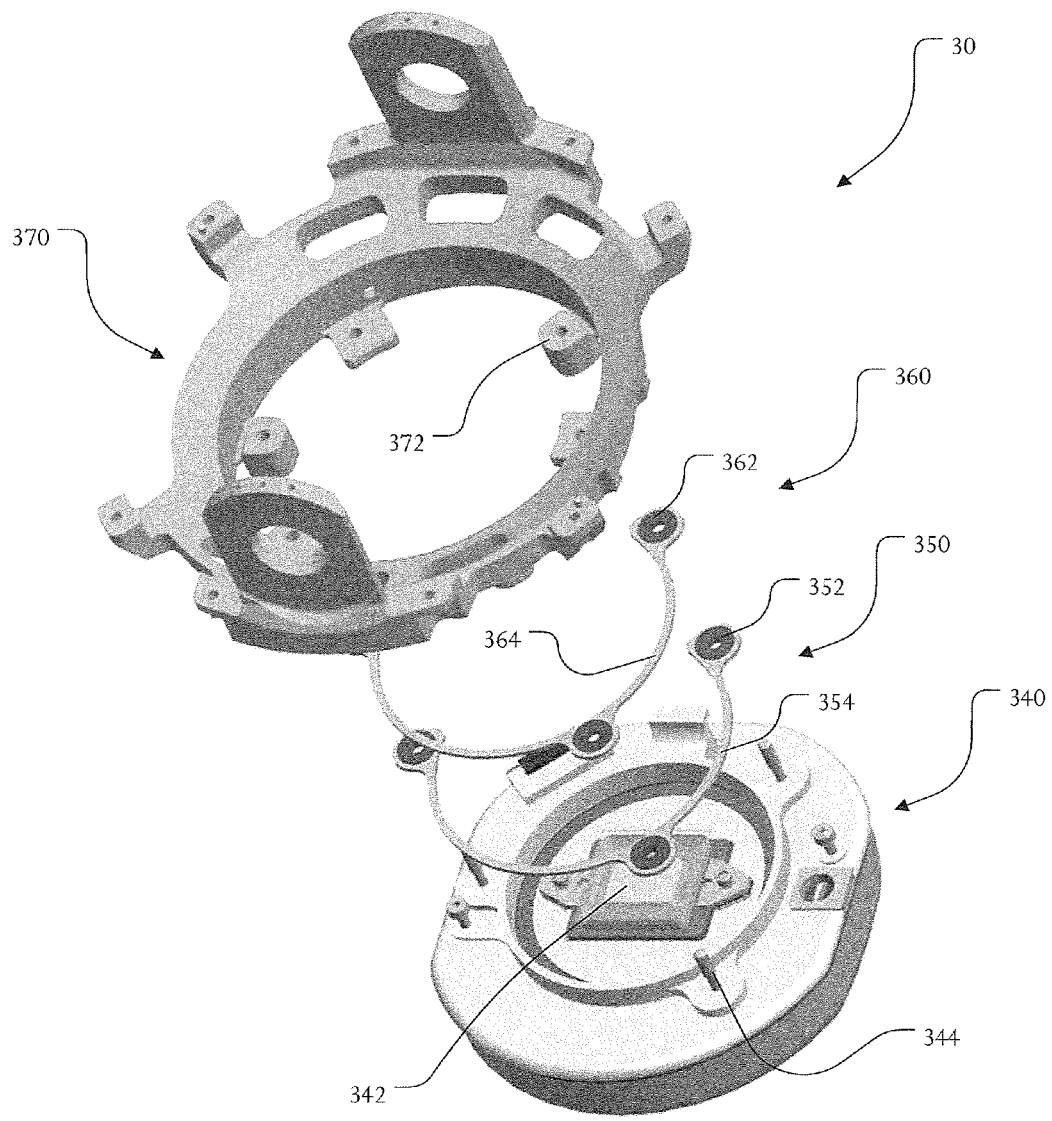
FIG. 3 shows portions of an optical system, according to an embodiment of the disclosure.

FIG. 3 shows portions 330 of an optical system, according to an embodiment of the disclosure. The portions 330 may be part of the optical system 220 of FIG. 2. The portions 330 of the optical system of FIG. 3 include a camera assembly 340, a first integrated shim retainer unit 350, a second integrated shim retainer unit 360, and a telescope camera mount 370.

The camera assembly 340 includes a detector 342. The detector 342 may be any device capable of receiving light and generating a signal or signals based on such received light. As a non-limiting, the detector 342 may be an array having pixels sensitive to light such as, for example, a charge-coupled device (CCD). The term "light," as used herein, is intended as being interpreted broadly to include a broad range of wavelengths of radiation of radiation, including those beyond the visible spectrum (e.g., infrared light). Thus, in particular embodiments, the detector 342 may be an infrared light detector. Although not expressly called out here, a variety of electronics may be associated with the camera assembly 340 and the detector. For purposes of brevity and because one of ordinary skill in the art will recognize such features, they are not described.

The camera assembly 340 also includes three mounting posts 344. The mounting posts 344 allow the mounting of other items thereon as will be described below.

The first integrated shim retainer unit 350 includes three spacers 352 and a retainer 354. The spacers 352 are configured to be placed on the three mounting posts 344. In particular configurations, each of the three spacers 352 have the same size such that one picking up the first integrated shim retainer unit 350 will have three same-sized spacers 352. The spacers 352 and the retainer 354 may be made of any suitable material. In one configuration, the spacers 352 and the retainer 354 are made of metal. The retainer 354 in the configuration of FIG. 3 is wishbone shaped and may provide certain benefits as described below with reference to FIG. 4.

The second integrated shim retainer unit 360, like the first integrated shim retainer 350, includes three spacers 362 and a retainer 364. The spacers 362 are configured to be placed on the three mounting posts 344. In particular configurations, each of the three spacers 362 have the same size such that one picking up the first integrated shim retainer unit 360 will have three same-sized spacers 362. The retainer 364 in the configuration of FIG. 3 is, like the retainer 352, wishbone shaped. The spacers 362 and the retainer 364 may be made of any suitable material. In one configuration, the spacers 362 and the retainer 364 are made of metal.

In certain configurations, the spacers 352 of the first integrated shim retainer unit 350 have different sizes than the spacers 362 of the second integrated shim retainer unit 360. Thus, for example, the first integrated shim retainer unit 350 may serve as a coarse adjustment on spacing between whereas the second integrated shim retainer unit 360 may serve as a fine adjustment on spacing between optics (not expressly shown in FIG. 3, but seen in FIG. 1) and the detector 342.

Although two integrated shim retainer units (350, 360) have been shown, more than two more may be utilized. Additionally, in certain configurations only one integrated shim retainer unit may be utilized. Additionally, in certain configurations, other intermediate devices such as washers may be utilized. Further detail of the integrated shim retainer unit is provided below with reference to FIG. 4.

The telescope camera mount 370 has receiving portions 372 that are configured to be placed on the three mounting posts 344 on top of the spacers 352, 362. Although not shown in this view, a variety of optical elements (e.g., described as optics in FIG. 1) may be placed on the telescope camera mount to focus light on the detector 342. Such elements include, but are not limited to, mirrors and lenses. In certain configurations, such mirrors and lenses may be associated with a fixed focus telescope. The details of such an operation are not described as they will become apparent to one of ordinary skill in the art after having read this specification.

Figure 4:
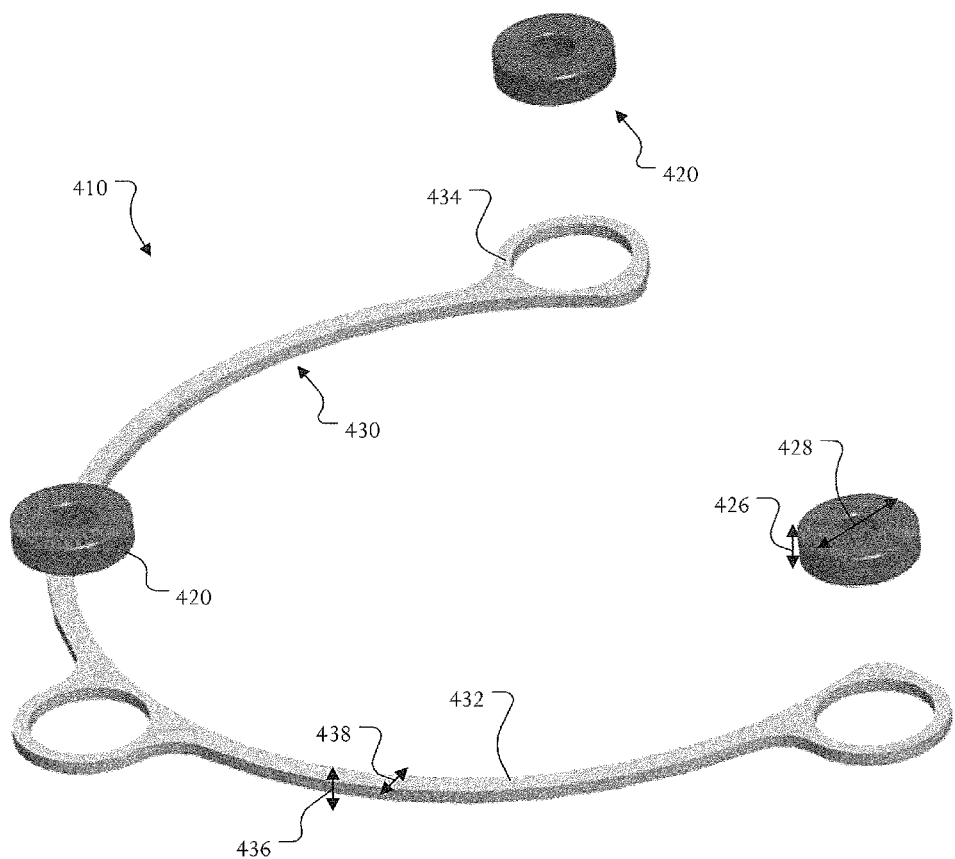
FIG. 4 illustrates further details of an integrated shim retainer unit 410, according to an embodiment of the disclosure.

FIG. 4 illustrates further details of an integrated shim retainer unit 410, according to an embodiment of the disclosure. The integrated shim retainer unit 410 of FIG. 4 may be either of the shim retainer units 350, 360 of FIG. 3. Similar to the integrated shim retainer units 350, 360 of FIG. 3, the integrated shim retainer unit 410 of FIG. 4 includes three spacers 420 and a retainer 430.

The retainer 430, which is shaped like a wishbone in FIG. 4, includes a retaining portion 434 and a connecting portion 432. The retaining portion 434 is configured to hold the spacers 420 whereas the connecting portion 432 is configured to keep the spacers 420 together. The retaining portion 434 may contain any suitable configuration for holding the spacers. The connecting portion 432 may allow one picking up the integrated shim retainer unit 410 to pick up three like-sized spacers 420.

In particular configurations, the weight of the retainer 430 is distributed such that a balance is maintained. That is, for example, when the integrated shim retainer unit 410 is placed atop the camera assembly 340 of FIG. 3, the moment with respected to a central point of the camera assembly 340 is zero, or easily counterbalanced to be zero. Such a balance may be accomplished by placing extra material in areas of the retainer 430, varying the materials for the retainer 430, or adding an appropriate counterbalance.

As shown in FIG. 4, a thickness 426 of the spacers 420 is less than a thickness 436 of the retaining portion 432 and the connecting portion 434 of the retainer 430. Additionally, a width 428 of the spacers 420 is less than a width 438 of the connecting portion 434 of the retainer 430. Such a configuration may help reduce the weight and size of the retainer 430.

In particular configurations, the retainer 430 may be disposable. For example, one picking up the integrated shim retainer unit 410 picks up three-similar sized spacers 420. After placing the spacers 420 on, for example, the three mounting posts 344 of the camera assembly 340 of FIG. 3, the retainer 430 may be removed. To facilitate such removability, any suitable configuration may be utilized on the retainer.

Although certain optical system embodiments have been described above as availing from the disclosed configurations herein, other non-optical systems may avail from the disclosed configurations. For example, any mechanical design needing space adjustments with multiple spacers between components may avail from the present disclosure.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a plurality of spacers configured to be placed between a first component and a second component within a system in order to modify a distance between the first and second components; and
a retainer configured to directly contact and hold the spacers and keep the spacers coupled to and spaced apart from each other in known positions prior to and during placement between the components within the system.

2. The apparatus of claim 1, wherein the spacers are configured to be placed between optics in an optical system.

3. The apparatus of claim 1, wherein the retainer is configured to be removed from the spacers after the spacers are positioned between the components within the system.

4. The apparatus of claim 1, wherein a thickness of the retainer is less than at least one thickness of the spacers.

5. The apparatus of claim 1, wherein:
the retainer includes a retaining portion and a connecting portion; and
a width of the connecting portion of the retainer is less than at least one width of the spacers.

6. The apparatus of claim 1, wherein the retainer is wishbone shaped.

7. The apparatus of claim 1, wherein the spacers are configured to be placed between optics and an image detector in an optical system.

8. The apparatus of claim 1, wherein:
the retainer is C-shaped with three retaining portions coupled by a connecting portion;
two of the retaining portions are located at ends of the C-shaped retainer and one of the retaining portions is located along a center of the C-shaped retainer; and
each retaining portion forms an opening configured to receive one of the spaces.

9. The apparatus of claim 1, wherein the spacers are nested in the retainer.

10. A system comprising:
a first component and a second component, the first component positioned adjacent the second component;
a plurality of first spacers placed between the first component and the second component, the first spacers modifying a distance between the first and second components; and
a retainer configured to directly contact and hold the first spacers and keep the first spacers coupled to and spaced apart from each other in known positions prior to and during placement between the components.

11. The system of claim 10, wherein the first and second components comprise optics within an optical system.

12. The system of claim 10, further comprising:
a plurality of second spacers placed between the first component and the second component, the second spacers placed on the first spacers; and
a second retainer configured to contact and hold the second spacers and keep the second spacers coupled to and spaced apart from each other in known positions during placement between the components.

13. The system of claim 10, wherein the first component comprises optics and the second component comprises a light detector.

14. The system of claim 10, wherein a thickness of the retainer is less than at least one thickness of the first spacers.

15. The system of claim 10, wherein:
the retainer includes a retaining portion and a connecting portion; and
a width of the connecting portion of the retainer is less than at least one width of the first spacers.

16. The system of claim 10, wherein the retainer is wishbone shaped.

17. The system of claim 10, wherein the system is configured for airborne flight.

18. The system of claim 10, further comprising:
a camera assembly with at least three mounting posts, wherein the first spacers are placed on the mounting posts.

19. The system of claim 10, wherein each of the first spacers is configured to directly contact at least one of the first component and the second component.

20. A method of adjusting a focus in an optical system, the method comprising:
placing first spacers on mounting posts of a camera assembly using a retainer;
wherein the camera assembly includes a light detector, the first spacers modifying a focus of light on the light detector; and
wherein the retainer directly contacts and holds the first spacers and keeps the first spacers coupled to and spaced apart from each other in known positions prior to and during placement on the mounting posts.

21. The method of claim 20, further comprising:
removing the retainer after the first spacers are on the mounting posts.

22. The method of claim 20, further comprising:
placing second spacers on the mounting posts of the camera assembly using a second retainer, the second spacers placed on the first spacers;
wherein the second retainer contacts and holds the second spacers and keeps the second spacers coupled to and spaced apart from each other in known positions during placement on the mounting posts.

23. The method of claim 22, further comprising:
removing the first and second retainers after the first and second spacers are on the mounting posts.

* * * * *